United States Patent
Kuzin et al.

(10) Patent No.: US 11,829,502 B2
(45) Date of Patent: *Nov. 28, 2023

(54) DATA SHARING VIA DISTRIBUTED LEDGERS

(71) Applicant: Capital One Services, LLC, McLean, VA (US)

(72) Inventors: Taras Kuzin, Vienna, VA (US); Qiaochu Tang, Frisco, TX (US); Steve Frensch, Kitchener (CA); John Santoro, Oakton, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,245

(22) Filed: Nov. 11, 2021

(65) Prior Publication Data

US 2022/0067189 A1 Mar. 3, 2022

Related U.S. Application Data

(63) Continuation of application No. 16/591,132, filed on Oct. 2, 2019, now Pat. No. 11,200,334, which is a
(Continued)

(51) Int. Cl.
*G06F 21/62* (2013.01)
*H04L 9/40* (2022.01)
(Continued)

(52) U.S. Cl.
CPC .......... *G06F 21/6218* (2013.01); *G06F 16/27* (2019.01); *G06F 16/28* (2019.01); *H04L 63/102* (2013.01); *H04L 9/50* (2022.05)

(58) Field of Classification Search
CPC . H04L 63/102; H04L 9/3213; H04L 2209/38; G06F 16/27–28; G06F 21/62; G06F 21/6218
See application file for complete search history.

(56) References Cited

U.S. PATENT DOCUMENTS 8,214,291 B2 7/2012 Pelegero et al.
9,251,372 B1 2/2016 Lahoz et al.
(Continued)

FOREIGN PATENT DOCUMENTS

| EP | 3376452 A1 | 9/2018 |
| WO | 2017066002 A1 | 4/2017 |
| WO | 2018209222 A1 | 11/2018 |

OTHER PUBLICATIONS

Jul. 14, 2022—Search Report—App No. GB2008446.

*Primary Examiner* — Linglan Edwards
(74) *Attorney, Agent, or Firm* — Banner & Witcoff, Ltd.

(57) ABSTRACT

Systems as described herein may include authorizing the sharing of data and sharing data between a variety of systems. A request to share data may be provided to a first system. The system may create sharing session data on a distributed ledger accessible by a number of systems. Sharing session data may be stored using a transaction stored on a distributed ledger. A second system may obtain the sharing session account and verify the sharing session. On verification of the sharing session, a variety of data may be shared between the systems identified in the sharing session data. The sharing session data may be established between two or more systems. The distributed ledger may be maintained by the systems themselves and/or a distributed network system. In a variety of embodiments, encrypted data may be stored and/or obtained using the distributed ledger.

20 Claims, 9 Drawing Sheets

Related U.S. Application Data continuation of application No. 16/431,299, filed on Jun. 4, 2019, now Pat. No. 10,474,834.

(51) Int. Cl.
    *G06F 16/27*     (2019.01)
    *G06F 16/28*     (2019.01)
    *H04L 9/00*     (2022.01)

(56) References Cited

U.S. PATENT DOCUMENTS

| | | | |
|---|---|---|---|
| 10,116,667 | B2 | 10/2018 | Johnsrud |
| 10,192,073 | B2 * | 1/2019 | Marin .................. G06F 21/57 |
| 10,282,558 | B2 * | 5/2019 | Chan .................. G06Q 40/00 |
| 10,346,815 | B2 | 7/2019 | Glover et al. |
| 10,474,640 | B1 | 11/2019 | Roche, Jr. |
| 10,938,564 | B2 * | 3/2021 | Jacobs ................ G06Q 20/02 |
| 10,943,029 | B2 * | 3/2021 | Marin ................ G06F 21/6272 |
| 2004/0158746 | A1 | 8/2004 | Hu et al. |
| 2005/0204041 | A1 | 9/2005 | Blinn et al. |
| 2013/0297501 | A1 | 11/2013 | Monk et al. |
| 2016/0005032 | A1 | 1/2016 | Yau et al. |
| 2016/0261411 | A1 | 9/2016 | Yau et al. |
| 2016/0285633 | A1 | 9/2016 | Allinson et al. |
| 2016/0330027 | A1 | 11/2016 | Ebrahimi |
| 2017/0109744 | A1 | 4/2017 | Wilkins et al. |
| 2017/0132615 | A1 | 5/2017 | Castinado et al. |
| 2017/0132630 | A1 | 5/2017 | Castinado et al. |
| 2017/0149560 | A1 | 5/2017 | Shah |
| 2017/0243215 | A1 | 8/2017 | Sifford et al. |
| 2017/0257358 | A1 | 9/2017 | Ebrahimi et al. |
| 2017/0329980 | A1 | 11/2017 | Hu et al. |
| 2017/0330174 | A1 | 11/2017 | Demarinis et al. |
| 2017/0366353 | A1 | 12/2017 | Struttmann |
| 2018/0060496 | A1 | 3/2018 | Bulleit et al. |
| 2018/0075686 | A1 * | 3/2018 | Campero ........... G07C 9/00182 |
| 2018/0114205 | A1 | 4/2018 | Thomas et al. |
| 2018/0144156 | A1 * | 5/2018 | Marin .................. G06F 21/602 |
| 2019/0012637 | A1 | 1/2019 | Gillen |
| 2019/0018947 | A1 | 1/2019 | Li |
| 2019/0026672 | A1 | 1/2019 | Notani |
| 2019/0028277 | A1 | 1/2019 | Jayachandran et al. |
| 2019/0034923 | A1 * | 1/2019 | Greco .................. G06Q 20/389 |
| 2019/0036698 | A1 | 1/2019 | Anglin et al. |
| 2019/0087892 | A1 | 3/2019 | Pinski et al. |
| 2020/0042958 | A1 | 2/2020 | Soundararajan et al. |
| 2020/0327546 | A1 | 10/2020 | Pennington et al. |

\* cited by examiner

DATA SHARING VIA DISTRIBUTED LEDGERS

CROSS-REFERENCE TO RELATED APPLICATIONS

This application is a continuation of U.S. patent application Ser. No. 16/591,132 filed Oct. 2, 2019, which is a continuation of and claims priority to U.S. patent application Ser. No. 16/431,299 filed Jun. 4, 2019, now U.S. Pat. No. 10,474,834 issued Nov. 12, 2019, the disclosures of which are hereby incorporated by reference in their entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to sharing data and more specifically to the authorization of data sharing between multiple systems.

BACKGROUND

A variety of systems may store data regarding a user in a secure fashion. This data is generally proprietary to the system storing the data and not accessible by external systems. Authorization of the sharing of data between systems is typically implemented by sharing account information, such as usernames and passwords, or using an access delegation framework, such as OAuth. Sharing account information is generally insecure as any malicious party acquiring the account information may masquerade as the user without detection. Access delegation frameworks typically do not facilitate sharing between more than two systems and fail to provide a standardized interface for sharing between systems, thereby limiting interoperability between systems.

Aspects described herein may address these and other problems, and generally improve the quality, efficiency, and speed of sharing data between systems by providing tokens using a distributed ledger for automatically authorizing the transfer of data between systems.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include authorizing the sharing of data and sharing data between a variety of systems. A request to share data may be provided to a first system. The system may create sharing session data on a distributed ledger accessible by a number of systems. Sharing session data may be stored using a transaction stored on a distributed ledger. A second system may obtain the sharing session data and verify the sharing session. On verification of the sharing session, a variety of data may be shared between the systems identified in the sharing session data. The sharing session data may be established between two or more systems. The distributed ledger may be maintained by the systems themselves and/or a distributed network system. In a variety of embodiments, encrypted data may be stored and/or obtained using the distributed ledger.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
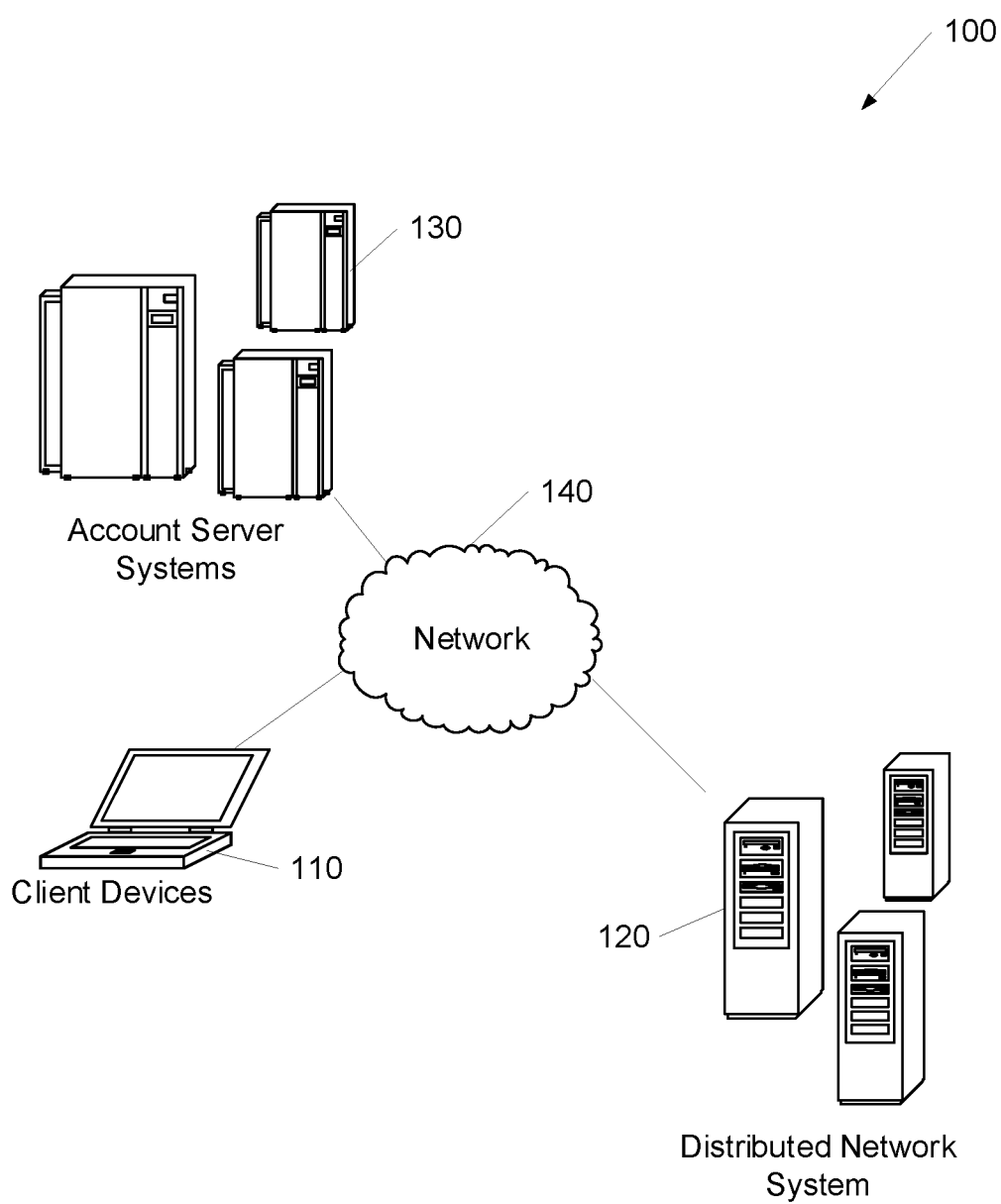
FIG. 1 shows an example of a data sharing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for authorizing and sharing data between multiple systems. Users may have account data stored across a variety of account systems. Many users wish to aggregate their data into a single interface for easy review and/or analysis. Existing aggregation systems typically use account information sharing and/or an access delegation framework to obtain access to a user's account on a particular system via a web interface. The aggregation system may then scrape the web interface to obtain the user's data. However, this approach has a number of drawbacks and limitations. Sharing account information, such as a user's username and password, for a particular system presents a large security risk as any malicious party which obtains the username and password gains access to the user's account. Access delegation frameworks, such as OAuth, generally use the user's account information and do not readily allow for sharing data between more than two parties. In the event that the user wishes to change their password on one system, the user must also update the information used by the aggregation system as the aggregation system will not be able to access the system after the password has changed. Additionally, any change in the format of the web interface presented by a particular system may cause an aggregation system to be unable to parse the web interface to scrape the necessary data.

Data sharing systems as described herein allow for the sharing of data between a variety of systems without the drawbacks of existing systems. A request to share data may be provided to a first system. The system may create sharing session data on a distributed ledger accessible by a number of systems. Sharing session data may be stored using a transaction stored on a distributed ledger and/or a smart contract that may be executed by a distributed network system. A second system may obtain the sharing session data and verify the sharing session. On verification of the sharing session, a variety of data may be shared between the systems identified in the sharing session data. The sharing session data may be established between two systems and/or a number of systems. The distributed ledger may be maintained by the systems themselves and/or a distributed network system. The distributed network system may provide a publicly available mechanism for executing smart contracts.

In many aspects, a data sharing device may request a sharing session between two or more account server systems. A first account server system may create sharing session data on a distributed ledger. A second account server system may obtain the sharing session data and request verification of the sharing session from the data sharing device. On verification of the sharing session, both account server systems may transmit data associated with the sharing session to each other. In several aspects, data from each account server system may be received by a data sharing device in a session with either account server system.

Data sharing systems improve the functioning of computer systems to securely share data across multiple systems by reducing the computational power and storage needed to authenticate and share data between devices. Access delegation frameworks typically require a number of tokens that scales exponentially with the number of systems sharing data. Sharing session data utilized in data sharing systems scales linearly with the number of systems sharing data. Additionally, sharing session data utilizes secure approval received from a data sharing device, providing a verification that data should be shared without requiring a username and password to be provided to an account server system. Security may be further improved by only allowing access to a distributed ledger and/or distributed network system to particular IP addresses and/or subnets.

Data Sharing Systems

FIG. 1 shows a data sharing system 100. The data sharing system 100 may include at least one data sharing device 110, at least one distributed network system 120, and/or at least one account server system 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Data sharing devices 110 may request data sharing sessions, validate data sharing session requests, and/or obtain data as described herein. Distributed network systems 120 may store, modify, and/or execute distributed ledgers and/or smart contracts as described herein. A distributed network system may be publicly accessible and/or have restricted access. Access to a distributed network system may be limited to particular data sharing devices and/or account server systems. The data sharing devices and/or account server systems may be associated with a particular sharing session. Account server systems 130 may store a variety of data, maintain a distributed ledger, execute smart contracts, establish data sharing sessions, and/or request verification of a data sharing session as described herein. However, it should be noted that any device in the data sharing system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 140 may include a local area network (LAN), a wide area network (WAN), a wireless telecommunications network, and/or any other communication network or combination thereof.

The data transferred to and from various computing devices in data sharing system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the data sharing system 100 in front of one or more computing devices such that any external devices may communicate directly with the specialized hardware.

Computing Devices

Figure 2:
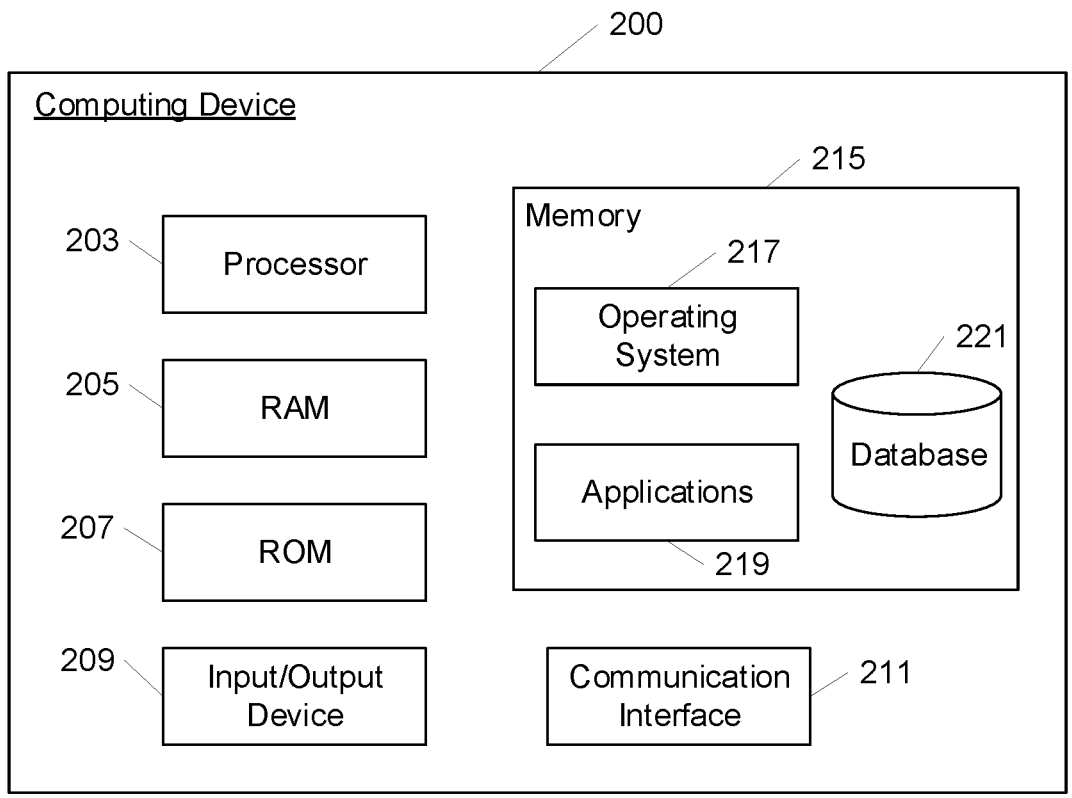
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Authorizing Data Sharing using Distributed Ledgers

Figure 3A:
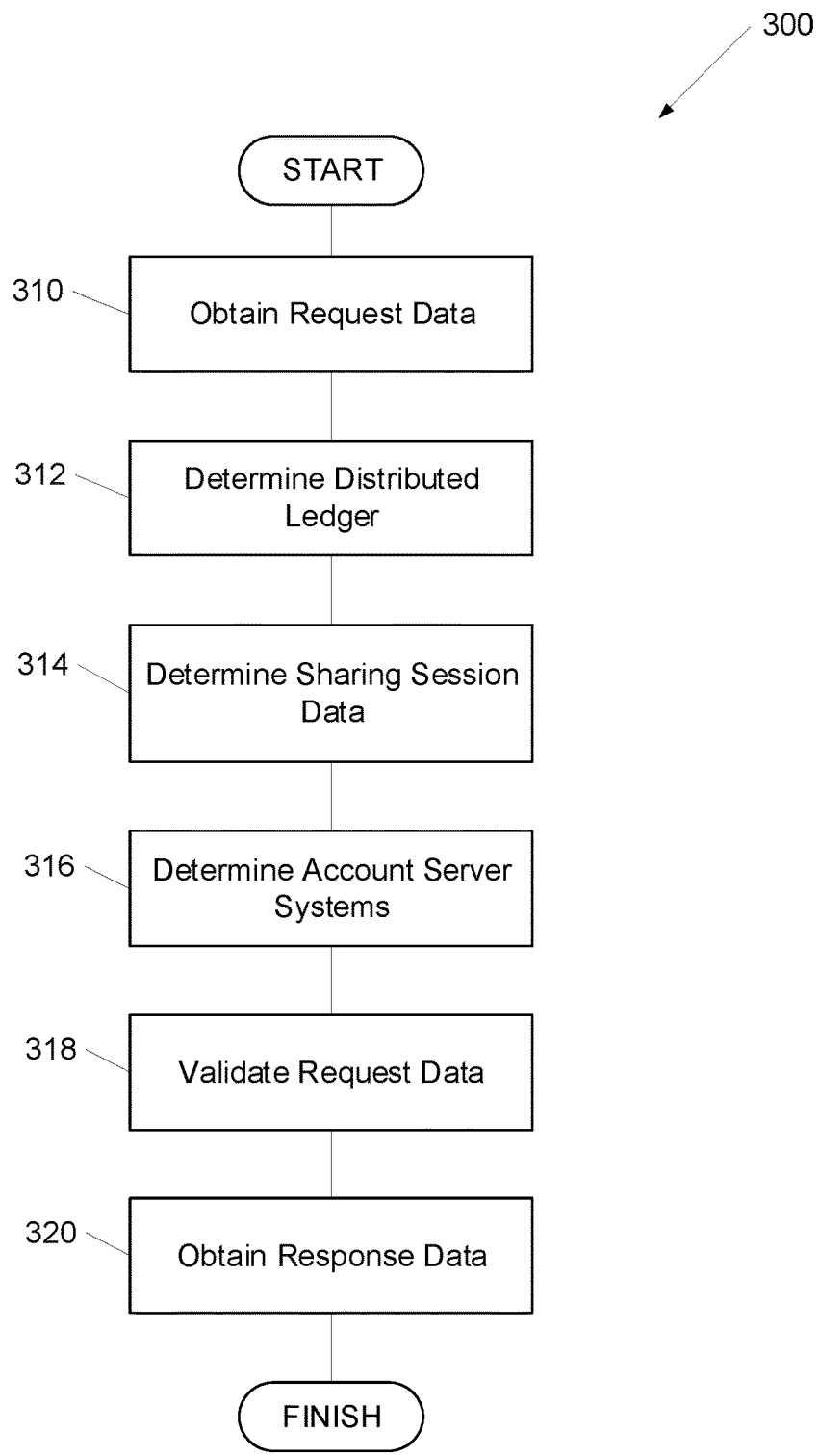
FIG. 3A shows a flow chart of a process for authorizing data sharing using distributed ledgers according to one or more aspects of the disclosure.

Data sharing systems may utilize a distributed ledger to authorize the sharing of data between various devices. The distributed ledger may include a unique token that may be used to identify particular data accessible via the various devices. The token may be used by a variety of account server systems to identify data responsive to a request for data and provide the response data. FIG. 3A shows a flow chart of a process for authorizing data sharing using a distributed ledger according to one or more aspects of the disclosure. Some or all of the steps of process 300 may be performed using one or more computing devices as described herein.

At step 310, request data may be obtained. The request data may identify a request to obtain data stored using one or more account server systems. The request data may be generated and/or transmitted by a data sharing device. In a variety of embodiments, the request data may indicate that a data sharing device wants to obtain data from a second account server system when accessing a first account server system. The request data may indicate account information, such as a username, account number, email address, and/or the like, for an account maintained by an account server system. The request data may indicate one or more account server systems from which data sharing is desired. The indication may be via any identifying data, such as a domain name, uniform resource locator, Internet Protocol address, a common name of the account server system, and/or the like.

At step 312, a distributed ledger may be determined. A distributed ledger may be determined for a pair of account server systems and/or a set of account server systems. A distributed ledger may be determined based on one or more account server systems identified in request data. The distributed ledger may be stored using one or more account server systems and/or a distributed network system. In several embodiments, a distributed network system includes a set of nodes operated by a set of account server systems. In many embodiments, a distributed network system includes a set of nodes operated by a public network. In a variety of embodiments, a distributed ledger is associated with one or more account server systems. The distributed ledger may be stored using those account server systems associated with the distributed ledger and/or may only be accessed by those account server systems associated with the distributed ledger. In this way, only those account server systems that are associated with a particular request and/or sharing session have access to the relevant sharing session data.

At step 314, sharing session data may be determined. The sharing session data may be determined based on the request data. In many embodiments, the sharing session data may include an email address and the determined sharing session data may have an email address corresponding to an email address identified in the request data. A distributed ledger may store sharing session data. In a variety of embodiments, the sharing session data may be determined by querying a distributed ledger to locate one or more pieces of sharing session data based on the request data. In many embodiments, a distributed network system may execute a transaction generated based on the request data to determine the sharing session data stored using a distributed ledger maintained by the distributed networks system. The sharing session data may identify a particular alias token associated with one or more account server systems associated with the sharing session data. In several embodiments, sharing session data identifies a pair of account server systems between which data may be shared. In a variety of embodiments, sharing session data identifies a set of account server systems between which data may be shared.

At step 316, account server systems may be determined. Account server systems may be determined based on an alias token indicated in the sharing session data, the session sharing data, and/or the distributed ledger. The determined account server systems may include those account server systems authorized to share data with the account server system processing the request data. In a variety of embodiments, determining the account server systems include identifying the account server systems storing some or all of the distributed ledger. In many embodiments, determining the account server systems includes identifying account server systems which have been granted permission to read and/or write to the distributed ledger. The account server systems may be determined based on a set of account server systems provided by a data sharing device.

At step 318, request data may be validated. In a variety of embodiments, the sharing session data includes a set of permission data associated with a particular alias token. Validating the request data may include determining if the request data was obtained during a valid time frame as defined by a start date and/or the end date defined by the permission data. Validating the request data may include determining if the request data requests data that has been authorized to be shared as defined by the permission data. In the event that the request data does not validate, response data may not be generated and/or transmitted. Validating the request data may also include generating audit data based on the request data. Audit data may include any of a variety of data including, but not limited to, the date and/or time the request data was generated and/or obtained, information identifying the user and/or data sharing device generating and/or transmitting the request data, the account server system(s) obtaining the request data, any alias tokens associated with the request data, and/or the results of validating the request data. The audit data may be recorded on the distributed ledger and/or maintained by one or more of the account server systems.

At step 320, response data may be obtained. The response data may be received directly from an account server system. The response data may be obtained by querying a distributed ledger and/or a distributed network system. In a number of embodiments, the response data is stored using a block maintained by a distributed ledger. In many embodiments, the response data is stored as a transaction recorded using a smart contract maintained by a distributed network system. The response data may include data associated with an account determined by the alias token. The response data may include a particular subset of the determined account data. The subset of account data may be based on permission data associated with the request data. The response data may be filtered and/or processed as specified in the request data. In a number of embodiments, the response data may include account data occurring within a particular date range and/or having particular characteristics. A variety of techniques for generating the obtained response data are described with respect to FIG. 4.

Authorizing Data Sharing using Smart Contracts

Figure 3B:
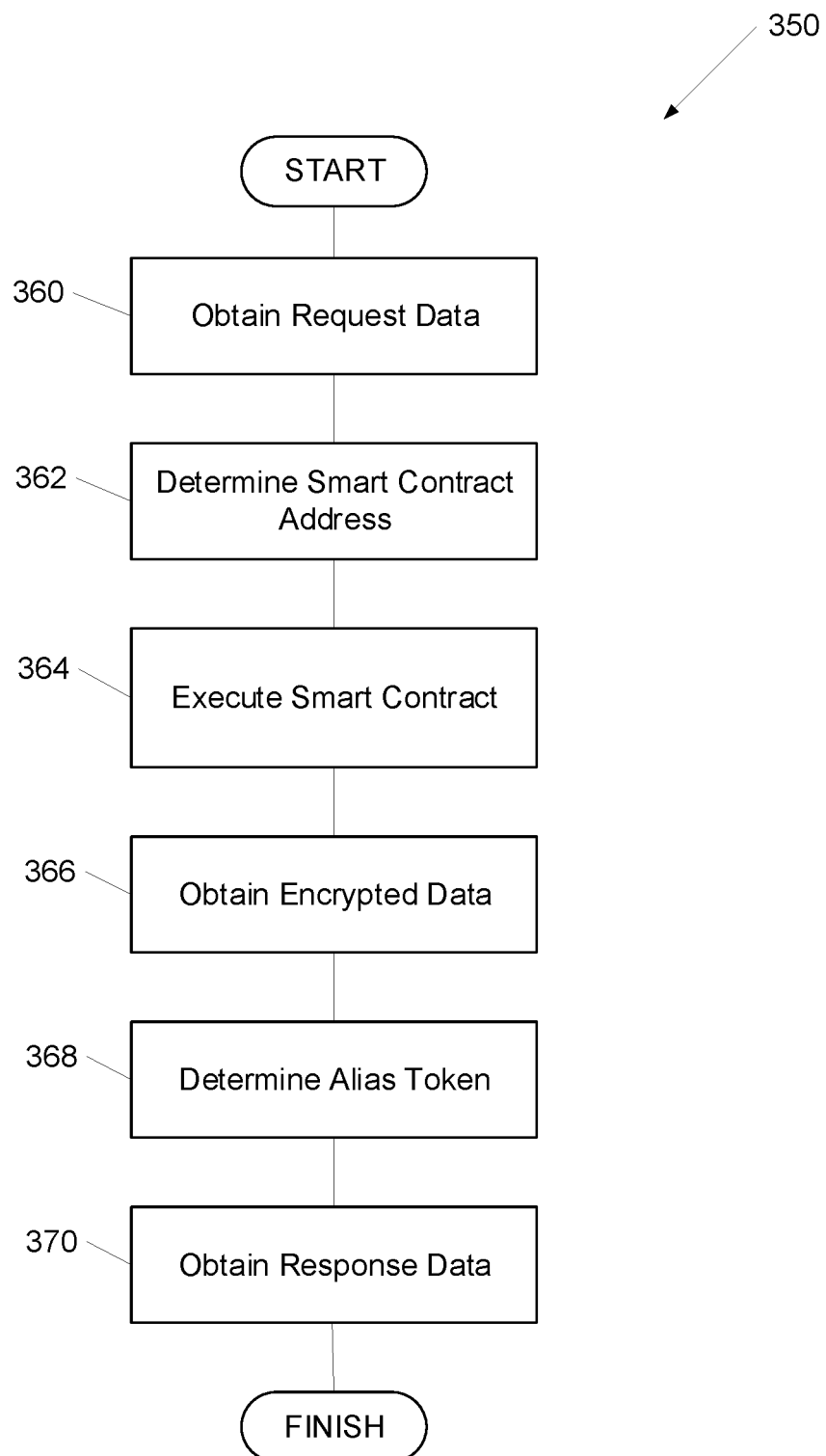
FIG. 3B shows a flow chart of a process for authorizing data sharing using smart contracts according to one or more aspects of the disclosure.

Data sharing systems may utilize a distributed network system to store and execute smart contracts to confirm the authorization of sharing between various devices. The smart contract may be associated with an alias token that may be used to identify particular data accessible via a number of computing devices. FIG. 3B shows a flow chart of a process for obtaining data using a smart contract according to one or more aspects of the disclosure. Some or all of the steps of process 350 may be performed using one or more computing devices as described herein.

At step 360, request data may be obtained. The request data may be obtained by an account server system and/or a distributed network system. The request data may identify a request to obtain data stored using one or more account server systems. The request data may be generated and/or transmitted by a data sharing device. The request data may indicate account information, such as a username, account number, email address, and/or the like, for an account maintained by an account server system. The request data may indicate one or more account server systems from which data sharing is desired. The indication may be via any data identifying an account server system, such as a domain name, uniform resource locator, Internet Protocol address, a common name of the account server system, and/or the like. The request data may indicate a smart contract address.

At step 362, a smart contract address may be determined. A smart contract address may be determined based on the alias token and/or the request data. In several embodiments, a smart contract may be specific to an email address identified in the request data. The smart contract address may be a unique identifier for a smart contract stored using a distributed network system. In many embodiments, a smart contract address includes an alphanumeric string beginning with the characters "0x". An account server system may store a mapping of an alias token and/or account identifier to a smart contract address. A data sharing device may determine a smart contract address by querying a database associated with a data sharing application executing on the data sharing device.

At step 364, a smart contract may be executed. The smart contract may be executed by sending some or all of the request data to the determined smart contract address. In a variety of embodiments, executing a smart contract includes compiling the smart contract into bytecode that may be executed by one or more nodes of a distributed network system. Any data stored using the smart contract and/or distributed ledger, such as sharing session data, alias tokens, request data, and/or response data, may be encrypted using any of a variety of encryption techniques. In several embodiments, one or more public key infrastructure (PKI) certificates may be used to encrypt data stored on the smart contract. In many embodiments, the request data may be encrypted using a public key associated with the specific account server system receiving the request data. The public key can be associated with a private key that is secret to the account server system and/or privately shared between several account server systems.

At step 366, encrypted data may be obtained. In several embodiments, the encrypted data may be obtained by processing a smart contract to identify encrypted data associated with the request data and/or identifying data indicated in the request data. In a number of embodiments, the encrypted data may be obtained by processing a smart contract to determine encrypted data which has been encrypted with a key, such as a public key, associated with a particular account server system and/or data sharing device. The encrypted data may be targeted toward specific data sharing devices and/or account server systems based on the encryption key used to encrypt the data. By encoding the data with a public key associated with a particular device, only devices having the private key can then decode the encoded data. In this way, the encrypted data may be stored using a publicly accessible distributed network system without allowing third parties to inspect the contents of the encrypted data. The encrypted data may be obtained by an account server system and/or a data sharing device. In many embodiments, an account server system may obtain encrypted data based on authorization data provided by a data sharing device. The authorization data may include a decryption key for the encrypted data generated based on the request data provided by the data sharing device. In a variety of embodiments, the request data includes the authorization data.

At step 368, an alias token may be determined. The alias token may be determined by decoding the encrypted data. The encrypted data may be decrypted with a private key associated with a computing device, such as the computing device obtaining the request data and/or providing the request data to the distributed network system. The private key may be associated with a public key used to encrypt the encrypted data. In several embodiments, the encrypted data is decrypted based on a decryption key provided in the request data and/or authorization data. Decrypting the encrypted data may also indicate one or more account server systems associated with the alias token. In a variety of embodiments, the alias token is mapped to a particular account server system. In several embodiments, the alias token is encrypted using a public key associated with a particular account server system such that the account server system may only decrypt alias tokens associated with sharing sessions associated with the account server system.

At step 370, response data may be obtained. The response data may be received directly from an account server system. The response data may be obtained by querying a distributed ledger and/or a distributed network system. In a number of embodiments, the response data is stored using a block maintained by a distributed ledger. In many embodiments, the response data is stored as a transaction recorded using a smart contract maintained by a distributed network system. The response data may include account data obtained from multiple account server systems and aggregated (or otherwise combined) to provide a single stream of response data. A variety of techniques for generating the obtained response data are described with respect to FIG. 4.

Obtaining Response Data

Figure 4:
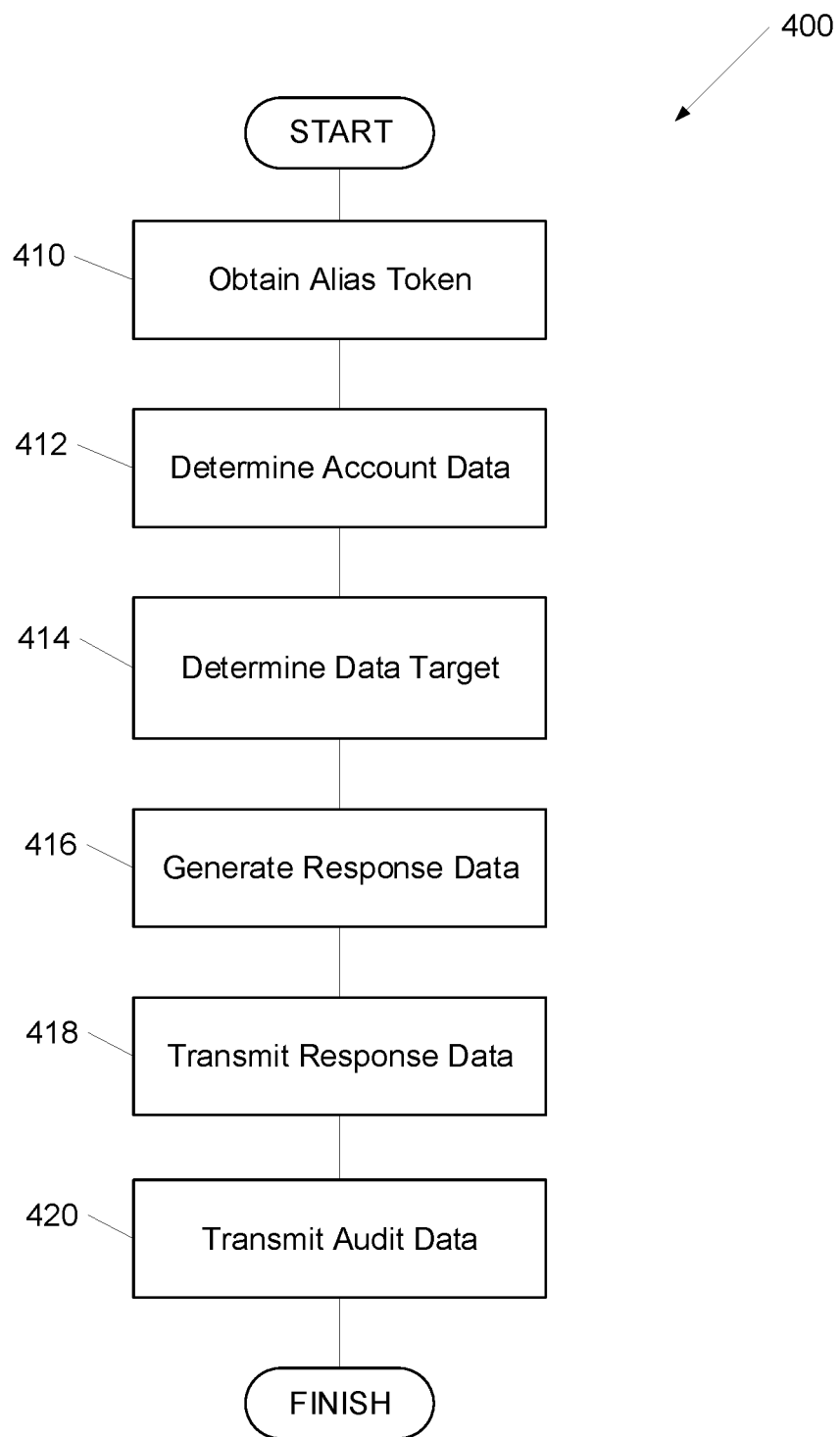
FIG. 4 shows a flow chart of a process for obtaining response data according to one or more aspects of the disclosure.

An alias token may be used by a variety of account server systems to identify data responsive to a request for data and provide the response data. An account server system may transmit the response data to any of a number of computing devices. In a variety of embodiments, the response data may be stored using the smart contract and/or a distributed ledger. In several embodiments, the response data may be encrypted. FIG. 4 shows a flow chart of a process for obtaining response data according to one or more aspects of the disclosure. Some or all of the steps of process 400 may be performed using one or more computing devices as described herein.

At step 410, an alias token may be obtained. The alias token may be obtained from a data sharing device, an account server system, and/or a distributed network system as appropriate. The alias token may uniquely identify accounts associated with a data sharing device. The accounts may be managed by one or more account server systems. Each account server system may map the alias token to a particular account identifier unique to a particular account server system. The obtained alias token may include metadata indicating a variety of permission data. The permission data may include, but is not limited to, a start date for sharing data, an end date for sharing data, and/or a set of data which may be shared. The permission data may be on a per-account basis and/or common to each account maintained by an account server system. In many embodiments, the permission data may be maintained by each account server system. In several embodiments, the permission data may be mapped to an alias token by the account server system. The metadata may also indicate a data source to which any response data should be transmitted.

At step 412, account data may be determined. Account data may be determined based on the alias token. In many embodiments, an account server system maintains a mapping of alias tokens to one or more accounts managed by the account server system. In this way, the account data stored on account server systems may be determined without exposing any aspects of the account data on the distributed ledger and/or in the sharing session data. The alias token may be utilized to determine the account data without requiring the sharing of login information. The mapping of an alias token to an account maintained by an account server system need not include any information regarding other accounts stored by other account server systems. In this way, the mapping of an alias token to an account is private to a particular account server system and no account server system need to be aware of account information stored on any other account server system in order to determine the account data. The account data may be any data associated with a user account identified in a data sharing request and maintained by an account server system. The account data may include a set of dimensions and a set of attributes. The determined account data may include a subset of the dimensions and/or attributes based on permission data identified in the metadata and/or maintained by an account server system providing the account data.

At step 414, a data target may be determined. The data target may be determined by an account server system, based on the alias token, and/or be specified in the metadata associated with the alias token. A data target may indicate a location where response data and/or audit data should be transmitted. A data target may include any of a variety of data storage locations such as, but not limited to, a data sharing device, an account server system, a distributed network system, and/or a distributed ledger. A data sharing device may obtain response data and generate a display based on the response data. An account server system may obtain response data and aggregate the response data with other data generated by the account server system and/or received from other account server systems. A variety of transformations may be performed on the aggregated data as described herein.

At step 416, response data may be generated. The response data may include data associated with an account determined by the alias token. The response data may include account data obtained from a variety of account server systems. The response data may include account data obtained from multiple account server systems and aggregated (or otherwise combined) to provide a single stream of response data. The response data may include a particular subset of the determined account data. The subset of account data may be based on the permission data associated with the alias token. The response data may be filtered and/or processed using any of a variety of extract, transform, and load processes. In many embodiments, the response data may include account data occurring within a particular date range and/or having particular characteristics. The response data may include account data obtained from a variety of account server systems. In a number of embodiments, the response data is encrypted using a public key associated with a data sharing device (and/or a user account associated with the data sharing device) providing the request data. In a variety of embodiments, the response data is encrypted using a public key associated with an account server system.

At step 418, response data may be transmitted. The response data may be transmitted to the determined data targets. The response data may be transmitted to a data target using a variety of communication structures such as, but not limited to, an application programming interface and/or a web service. In a variety of embodiments, the response data is transmitted to a smart contract managed by a distributed network system. The distributed network system may update the smart contract to include the response data. The response data may be stored using one or more functions defined in a smart contract. An account server system and/or data sharing device may request execution of the functions by the distributed network to obtain the response data from the distributed network system. The smart contract may verify that the computing device requesting the function to be perform is associated with an authorized data sharing session as described in more detail with respect to FIG. 6. In a number of embodiments, a node in the distributed network system transmits the updated smart contract to some or all of the other nodes in the distributed network system. In a number of embodiments, the generated response data may be transmitted to one or more computing devices maintaining a distributed ledger. A data block may be generated and recorded on the distributed ledger. The data block may include the response data and a header. The header may include a variety of data including, but not limited to, a unique identifier for the data block, metadata describing the structure of the response data, an identifier of a previous (e.g. parent) block, the time the data block was generated, and/or a verification hash. The verification hash may be used to verify the data block is valid and has not been altered. In many embodiments, the verification hash may include an alphanumeric string generated based on the response data using any hashing function, such as MD5. In a variety of embodiments, the verification hash may be based on the data block and the previous block.

At step 420, audit data may be transmitted. Generating the request data may also include generating audit data based on the request data. The audit data may include any of a variety of data including, but not limited to, the date and/or time the response data was generated and/or obtained, information identifying the user and/or data sharing device generating and/or transmitting the response data, the data targets, and/or the alias token associated with the response data. In several embodiments, the audit data is encrypted using a public key associated with a data sharing device (and/or a user account associated with the data sharing device) and/or account server system receiving the response data. In several embodiments, the audit data is transmitted to the determined data targets. The audit data may be transmitted using any application programming interfaces and/or web services as described herein. In many embodiments, the audit data is recorded on a distributed ledger and/or stored using a smart contract. The audit data may be transmitted to a distributed network system and/or account server system managing the distributed ledger and/or smart contract. The audit data may be stored using a function provided by a smart contract and/or a data block maintained on a distributed ledger as described herein.

Generating Distributed Ledgers

Figure 5:
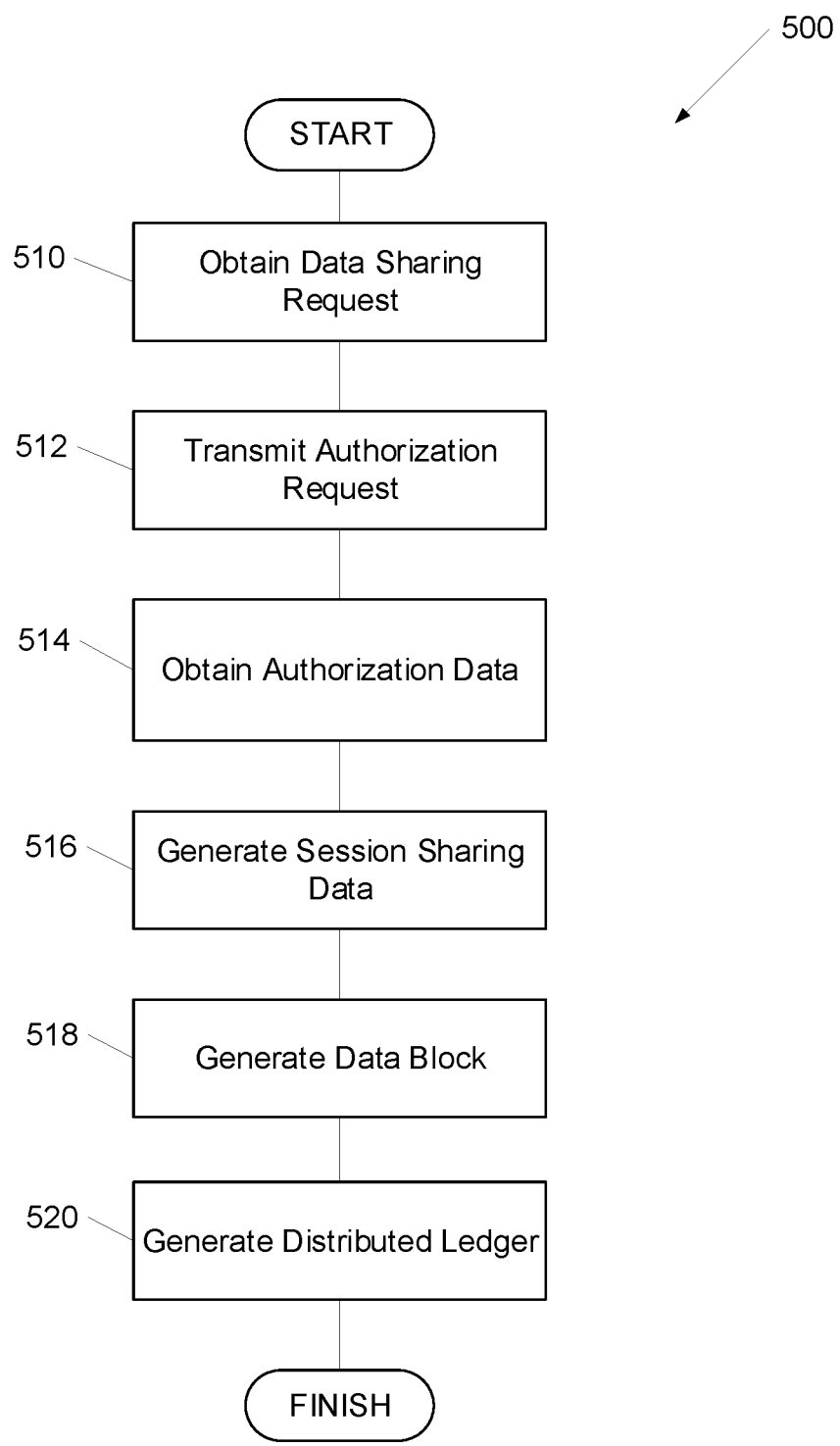
FIG. 5 shows a flow chart of a process for generating a distributed ledger according to one or more aspects of the disclosure.

A distributed ledger allows for the efficient authorization of data sharing between a variety of computing devices without exposing confidential and/or proprietary data. FIG. 5 shows a flow chart of a process for generating a distributed ledger according to one or more aspects of the disclosure. Some or all of the steps of process 500 may be performed using one or more computing devices as described herein.

At step 510, a data sharing request may be obtained. A data sharing request may indicate that data associated with a particular data sharing device (e.g. a user account) should be shared between a set of account server systems. A data sharing request may indicate identifying information for a data sharing device with respect to one or more account server systems, such as a device identifier, email address, and/or digital signature. The data sharing request may also include permission data. The permission data may include, but is not limited to, a start date for sharing data, an end date for sharing data, and/or a set of data which may be shared. The permission data may be on a per-account basis and/or common to each account server system.

At step 512, an authorization request may be transmitted. An account server system may transmit an authorization request to a data sharing device associated with the data sharing request. An authorization request may be transmitted by each account server system indicated in the data sharing request. An authorization request may include an indication of the data sharing device providing the data sharing request and an indication of the account server system providing the authorization request. A variety of techniques for obtaining and processing authorization requests are described in more detail with respect to FIG. 7.

At step 514, authorization data may be obtained. The authorization data may be a specific authorization in response to the authorization request. The authorization data may be provided by a data sharing device using any of a variety of techniques, such as those described in more detail with respect to FIG. 7.

At step 516, sharing session data may be generated. The sharing session data may include, but is not limited to, a start date, an end date, the permission data, an alias token, an identifier indicated in the data sharing request, and/or a set of account server systems between which data is authorized to be shared. The alias token may include a unique identifier identifying a data sharing device and/or user account associated with the data sharing device. The identifying information for the data sharing device and/or user account may be indicated in the data sharing request. The unique identifier may include a statistically unique set of alphanumeric characters. If no alias token exists, a new alias token may be generated based on the data sharing request.

At step 518, a data block may be generated. A data block may include the sharing session data and/or header data. The header data may include a variety of data including, but not limited to, a unique identifier for the data block, metadata describing the structure of the sharing session data, an identifier of a previous (e.g. parent) block, the time the data block was generated, and/or a verification hash. The verification hash may be used to verify the data block is valid and has not been altered. In a number of embodiments, the verification hash may include an alphanumeric string generated based on the sharing session data using any hashing function, such as MD5. In several embodiments, the verification hash may be based on the data block and the previous block. In many embodiments, the format of a data block is standardized across all account server systems accessing a particular distributed ledger. The sharing session data and/or data block may be encrypted using any of a variety of security mechanisms as described herein.

At step 520, a distributed ledger may be generated. A distributed ledger may be generated and stored using a set of nodes. The set of nodes may include an account server system, a set of account server systems, and/or a distributed network system. Some or all of the nodes may store the entire distributed ledger and/or a portion of the distributed ledger. The distributed ledger may store a set of data blocks. The generated data block may be provided to a node. The node may generate the distributed ledger by writing the generated data block to the distributed ledger. Each node that writes a data block to the distributed ledger may transmit an updated distributed ledger and/or the data block to some or all of the other nodes. A data sharing device and/or account server system may obtain session sharing data stored using the distributed ledger to authorize data sharing to authorize data sharing and/or share data as described herein. The distributed ledger may indicate a set of computing devices that are authorized to read from and/or write to the distributed ledger. A particular computing device may be able to read data stored on the distributed ledger but not write data to the distributed ledger and vice versa.

Generating Smart Contracts

Figure 6:
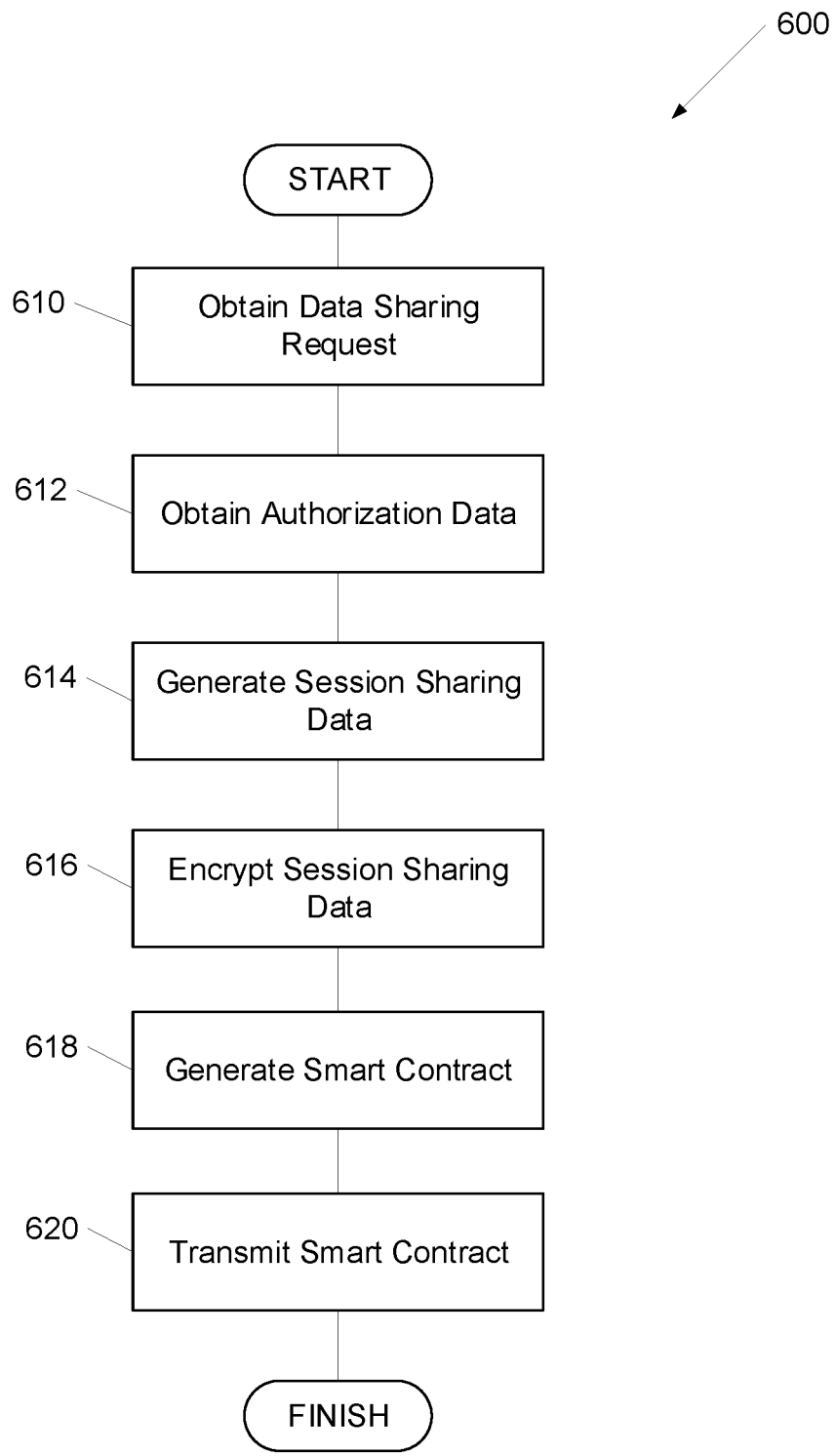
FIG. 6 shows a flow chart of a process for generating a smart contract according to one or more aspects of the disclosure.

A smart contract allows for the efficient authorization of data sharing between a variety of computing devices without exposing confidential and/or proprietary data. In a variety of embodiments, a smart contract may provide encrypted data that may only be processed by authorized devices. In this way, a smart contract may be provided by a publicly accessible distributed network system and provide a secured mechanism for authorizing the sharing of data. FIG. 6 shows a flow chart of a process for generating a smart contract according to one or more aspects of the disclosure. Some or all of the steps of process 600 may be performed using one or more computing devices as described herein.

At step 610, a data sharing request may be obtained. A data sharing request may indicate that data associated with a particular data sharing device (e.g. a user account) should be shared between a set of account server systems. A data sharing request may indicate identifying information for a data sharing device with respect to one or more account server systems, such as a device identifier, email address, and/or digital signature. The data sharing request may also include permission data. The permission data may include, but is not limited to, a start date for sharing data, an end date for sharing data, and/or a set of data which may be shared. The permission data may be on a per-account basis and/or common to each account server system. The data sharing request may include an alias token uniquely identifying the data sharing request as described herein.

At step 612, authorization data may be obtained. An account server system may transmit an authorization request to a data sharing device associated with the data sharing request. An authorization request may be transmitted by each account server system indicated in the data sharing request. An authorization request may include an indication of the data sharing device providing the data sharing request and an indication of the account server system providing the authorization request. The authorization data may be a specific authorization in response to the authorization request. The authorization data may be obtained from a data sharing device based on the authorization request. A variety of techniques for obtaining and processing authorization requests are described in more detail with respect to FIG. 7.

At step 614, sharing session data may be generated. The sharing session data may include, but is not limited to, a start date, an end date, the permission data, an alias token, an identifier indicated in the data sharing request, and/or a set of account server systems between which data is authorized to be shared. The alias token may include a unique identifier identifying a data sharing device and/or user account associated with the data sharing device. The identifying information for the data sharing device and/or user account may be indicated in the data sharing request. The unique identifier may include a statistically unique set of alphanumeric characters. If no alias token exists, a new alias token may be generated based on the data sharing request.

At step 616, sharing session data may be encrypted. The session sharing data may be encrypted using a public key associated with one or more of the computing devices indicated in the data sharing request. In many embodiments, the session sharing data may be encrypted using a public key associated with an account server system that obtained the data sharing request. In a variety of embodiments, the session sharing data is encrypted using an encryption key provided in the data sharing request. In this way, the session sharing data may be decrypted and processed only by those computing devices having a valid decryption key, such as a private key associated with the account server system.

At step 618, a smart contract may be generated. A smart contract may include a set of functions which may be performed by a distributed network system, a set of input data on which the functions are performed, and a set of addresses to which the output data should be transmitted. In several embodiments, a smart contract function accepts an alias token as an input and outputs encrypted sharing session data indicating a set of account server systems that are authorized to share data based on the alias token. In a number of embodiments, a smart contract function accepts an identifier of an account server system as an input and provides an output including an alias token and a set of account server systems from which the account server system may request data. In many embodiments, an input to a smart contract function includes an identification of a user account, such as an email address, and outputs encrypted sharing session data indicating an alias token and a set of account server systems from which data may be requested. A data sharing device may decrypt the sharing session data and generate a set of requests for data for each of the account server systems based on the alias token as described herein. The generated smart contract may have a unique smart contract address associated with the smart contract. In a number of embodiments, the smart contract is signed by the computing device generating the smart contract such that a different computing device is unable to modify the smart contract. The smart contract may indicate a start date and an end date. The start date and end date define a range of time in which the smart contract may be properly executed. The start date and end date may be defined for the contract as a whole and/or on a per-function basis.

At step 620, a smart contract may be transmitted. The smart contract may be transmitted to a distributed network system. The distributed network system may be publicly accessible. The distributed network system may be a private distributed network system accessible only via a particular set of account server systems. Each computing device in the distributed network system may be a processing node for the distributed network system. A smart contract may have a unique smart contract address assigned by a node when the smart contract is obtained by a node in a distributed network system. The smart contract address may be generated based on the computing device transmitting the smart contract to the distributed network system. A smart contract may be compiled into executable bytecode by a node in the distributed network system. The node may transmit the smart contract and/or the executable bytecode to some or all of the nodes in the distributed network system. The smart contract may be transmitted to other nodes in the distributed network system in a data block. The data block may include a set of smart contracts and/or other data as described herein.

Authorizing Data Sharing

Figure 7:
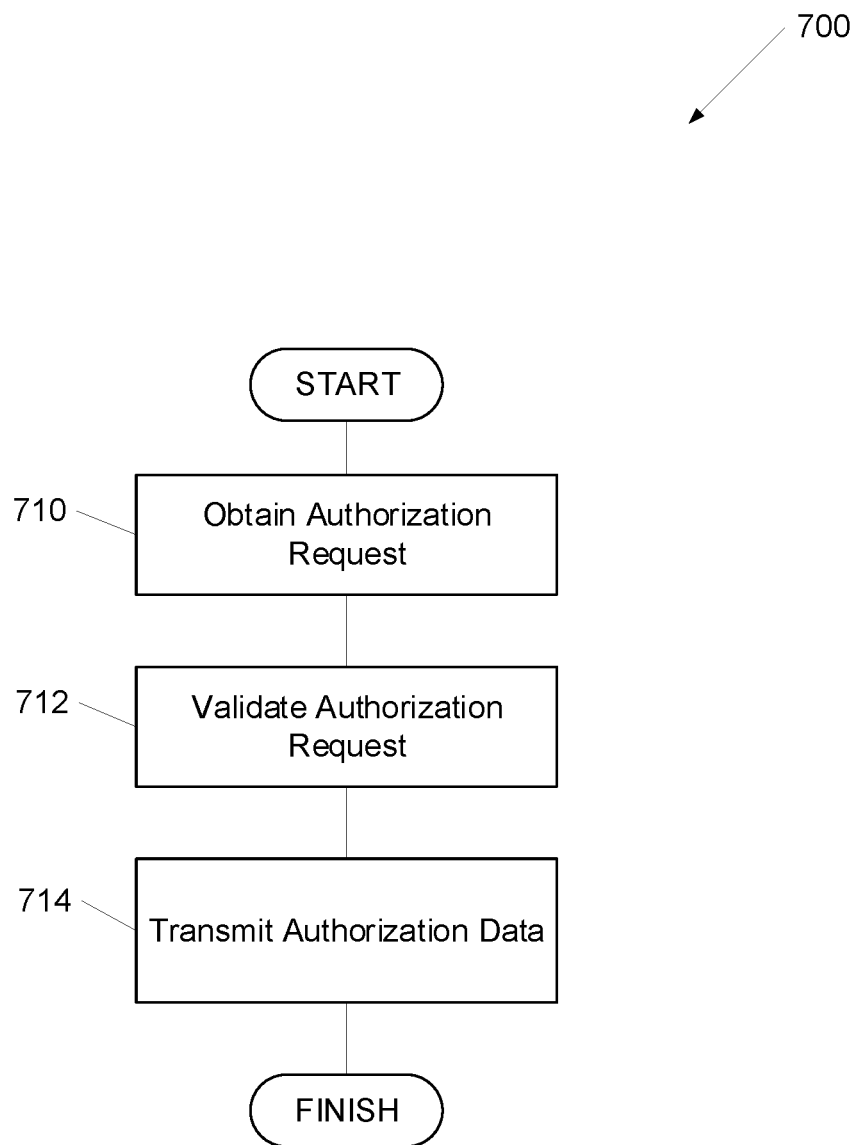
FIG. 7 shows a flow chart of a process for obtaining an authorization to share data according to one or more aspects of the disclosure.

A sharing request may cause a variety of account server systems to associate a particular alias token to accounts managed by the account server system. Account server systems may verify the sharing request so that malicious and/or improper sharing requests do not result in a data breach. FIG. 7 shows a flow chart of a process for obtaining an authorization to share data according to one or more aspects of the disclosure. Some or all of the steps of process 700 may be performed using one or more computing devices as described herein.

At step 710, an authorization request may be obtained. The authorization request may be generated based on a data sharing request as described herein. The authorization request may include a variety of data including, but not limited to, the identity of an account server system requesting authorization of a data sharing request, a summary of account information, one or more validation actions, a time at which a data sharing request was received, and/or an indication of the source of the data sharing request. In a variety of embodiments, an authorization request is obtained by a data sharing device. However, any computing device associated with an account managed by an account server system may obtain an authorization request. The authorization request may be obtained via any of a variety of communication channels such as, but not limited to, electronic mail, a short message service message, and/or a notification provided by a mobile device.

At step 712, an authorization request may be validated. An authorization request may be validated to ensure that the authorization request is sent by a valid account sharing system within a threshold time of a data sharing request. In a number of embodiments, an authorization request may indicate an internet protocol (IP) address of the sender of the authorization request. The IP address may be compared to a known list of IP addresses for the account server system indicated in the authorization request to validate that the authorization request originated from the account server system. In many embodiments, an IP address indicated in the authorization request may be provided to a domain name service to obtain a domain name associated with the IP address. The domain name may be compared to the domain name of the account server system indicated in the authorization request to verify the authorization request originated from the account server system.

At step 714, authorization data may be transmitted. Authorization data may be transmitted to an account server system based on one or more validation actions indicated in the authorization request. In several embodiments, a username and/or password may be provided to an account server system. The username and/or password may be used to verify that the account associated with the authorization request is associated with a particular user account maintained by the account server system. In a variety of embodiments, a validation action includes a one-time code that may be provided to an account server system to verify that the authorization request was properly requested. However, it should be noted that any data responsive to a validation action may be transmitted as appropriate.

Terminating Data Sharing

Figure 8:
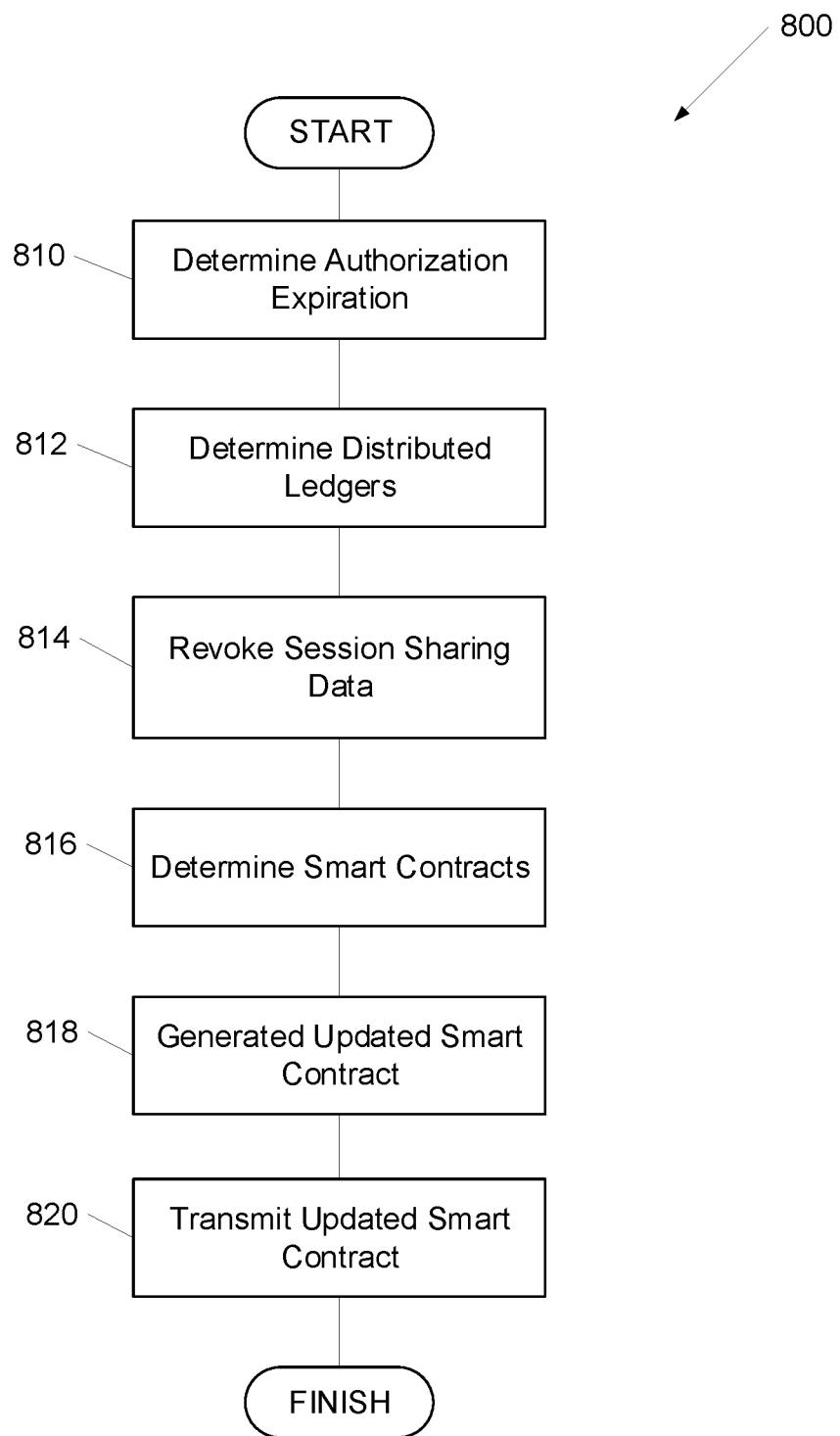
FIG. 8 shows a flow chart of a process for terminating an authorization according to one or more aspects of the disclosure.

A user may wish to terminate a previously granted sharing session. FIG. 8 shows a flow chart of a process for terminating an authorization for data sharing according to one or more aspects of the disclosure. Some or all of the steps of process 800 may be performed using one or more computing devices as described herein.

At step 810, an authorization expiration may be determined. In a variety of embodiments, a data sharing session may indicate an end date. An authorization expiration may be determined when a current date is after the indicated end date. In many embodiments, authorization expiration data may be obtained explicitly terminating a specific data sharing session. Authorization expiration data may indicate one or more pieces of sharing session data, an alias token, and/or any other identifying data as described herein. Authorization expiration data may indicate that a sharing session established with one or more account server systems should be terminated. In a number of embodiments, a subset of account server systems identified in the sharing session data are identified in the authorization expiration data.

At step 812, one or more distributed ledgers may be determined. A distributed ledger may store the indicated data sharing session as described herein. A distributed ledger may be determined based on the data sharing session. Multiple distributed ledgers may be maintained by multiple account server systems. In a variety of embodiments, a distributed ledger is determined by identifying one or more data blocks associated with the data sharing session and stored using a distributed networking system.

At step 814, sharing session data may be revoked. In several embodiments, the sharing session data may be revoked by deleting the sharing session data from the distributed ledger. In many embodiments, the sharing session data may be revoked by writing an updated block to the distributed ledger. The updated block may indicate the alias token associated with the sharing session data and that the alias token is no longer valid. In a variety of embodiments, the sharing session data may indicate an end date for the sharing session of any date preceding the date of the authorization expiration, so that the sharing session data is no longer valid.

At step 816, one or more smart contracts may be determined. A smart contract may be determined based on a smart contract address. A smart contract address may be determined based on the alias token and/or the sharing session data identified in the authorization expiration data. In several embodiments, authorization expiration data may include a smart contract address. The smart contract address may be a unique identifier for a smart contract stored using a distributed network system.

At step 818, updated smart contract data may be generated. In many embodiments, updated smart contract data includes the smart contract address of the determined smart contract and disables all functions defined in the determined smart contract. In several embodiments, only those functions associated with particular account server systems identified in the authorization expiration data are disabled. In this way, a subset of functions of the smart contract remain operational.

At step 820, updated smart contract data may be transmitted. The updated smart contract data may be transmitted to a distributed network system. In several embodiments, the distributed network system updates the smart contract data stored using the distributed network system to the transmitted updated smart contract data. In this way, the smart contract data remains accessible on the distributed network system but the disabled actions may no longer be executed by the distributed network system. In a variety of embodiments, transmitting the updated smart contract data causes a distributed network system to execute a self-destruct function defined in the smart contract. Executing a self-destruct function may cause each node in the distributed network system to remove the smart contract from the data stored on each node. In many embodiments, the self-destruct function may only be executed if the updated smart contract data is obtained by the distributed network system.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method, comprising:
    obtaining, by a server system and from a requesting system, request data comprising a user account identifier associated with an account maintained by the server system and an indication of desired data;
    determining, by the server system and based on a distributed ledger, an alias token associated with the user account identifier;
    determining, by the server system and based on the distributed ledger, a pairwise mapping between at least one related server system and the server system, wherein the pairwise mapping indicates that the at least one related server system and the server system are authorized to share the desired data;
    transmitting, by the server system and to the at least one related server system, a message comprising the alias token and the indication of desired data;
    obtaining, by the server system and from the at last one related server system, at least one response component comprising data corresponding to the indication of desired data and associated with the alias token;
    generating, by the server system, account data based on the indication of desired data;
    generating, by the server system, response data based on the indication of desired data, wherein the response data comprises the at least one response component and the account data; and
    transmitting, by the server system, the response data.

2. The method of claim 1, further comprising:
    obtaining, by the server system and from a third-party server system, a request for account information, wherein the request for account information comprises a second alias token;
    generating, by the server system, a second distributed ledger comprising a second pairwise mapping of the third-party server system to the server system; and
    transmitting, by the server system and to the third-party server system, the account information.

3. The method of claim 1, further comprising:
    transmitting, by the server system and to a computing device, a verification request comprising an identification of a third-party server system;
    obtaining, by the server system and from the computing device, sharing request response data; and
    when the sharing request response data indicates that account information should be shared, transmitting the account information.

4. The method of claim 1, wherein the distributed ledger comprises a start date and an end date for the pairwise mapping of the server system and the at least one related server system.

5. The method of claim 1, wherein:
    the distributed ledger comprises permission data associated with the user account identifier; and
    generating the account data is further based on the permission data.

6. The method of claim 1, further comprising transmitting the response data to a computing device, wherein the response data is usable to generate output data comprising the account data and the at least one response component.

7. The method of claim 1, wherein the distributed ledger is stored using the server system.

8. The method of claim 1, wherein the distributed ledger is stored using at least one of the at least one related server system.

9. The method of claim 1, wherein the distributed ledger is stored using a distributed network system.

10. The method of claim 1, further comprising:
obtaining, by the server system, a sharing request comprising an account identifier, a start date, an end date, a set of permissions, and an indication of a related server system;
generating, by the server system, the alias token;
generating, by the server system, a transaction block comprising the account identifier, the start date, the end date, the set of permissions, the indication of the related server system, and the alias token; and
recording, by the server system, the transaction block on the distributed ledger.

11. A computing device, comprising:
one or more processors; and
memory storing instructions that, when executed by the one or more processors, cause the computing device to:
obtain, from a third-party server system, a request for account information, wherein the request for account information comprises an alias token;
transmit, to another computing device, a verification request comprising an identification of the third-party server system;
obtain sharing request response data comprising an account identifier; and
based on the sharing request response data indicating that the third party server system and the computing device are authorized to share the account information:
generate a distributed ledger;
generate a transaction block comprising a pairwise mapping of the third-party server system to the computing device, the alias token, and the account identifier;
record the transaction block on the distributed ledger; and
transmit, to the third-party server system, the account information.

12. The computing device of claim 11, wherein:
the sharing request response data further comprises a start date and an end date; and
the transaction block further comprises the start date and the end date.

13. The computing device of claim 11, wherein:
the sharing request response data further comprises permission data associated with the account information; and
the transaction block further comprises the permission data.

14. The computing device of claim 11 wherein the distributed ledger is stored using the computing device.

15. The computing device of claim 11, wherein the distributed ledger is stored using the third-party server computing device.

16. The computing device of claim 11, wherein the distributed ledger is stored using a distributed network system.

17. A non-transitory machine-readable medium storing instructions that, when executed by one or more processors, cause the one or more processors to perform steps comprising:
obtaining request data comprising an account identifier and an indication of desired data;
determining an alias token associated with the account identifier;
determining, based on the alias token, a transaction block identifying a pairwise mapping between a related server system and the server system, wherein the transaction block comprises a start date of the pairwise mapping and an end date of the pairwise mapping, and wherein the pairwise mapping indicates that the related server system and the server system are authorized to share the desired data;
determining a current date when the request data was obtained; and
when the current date is after the start date and before the end date:
transmitting, to the related server system, a message comprising the alias token and the indication of desired data; and
obtaining, from the related server system, a response component comprising data corresponding to the indication of desired data and associated with the alias token; and
generating response data based on the request data, wherein the response data comprises the response component when the current date is after the start date and before the end date.

18. The non-transitory machine-readable medium of claim 17, wherein the instructions further cause the one or more processors to transmit the response data to a computing device, wherein the response data is usable to generate output data comprising the response data.

19. The non-transitory machine-readable medium of claim 17, wherein the instructions further cause the one or more processors to determine the transaction block by querying a distributed ledger to identify the transaction block based on the related server system.

20. The non-transitory machine-readable medium of claim 17, wherein:
the transaction block further comprises permission data; and
the instructions further cause the one or more processors to generate the response data based on the permission data.

* * * * *